(12) United States Patent
Ruckstuhl

(10) Patent No.: US 7,600,466 B2
(45) Date of Patent: Oct. 13, 2009

(54) APPARATUS FOR FILLING AND EMPTYING A BREWING CHAMBER

(75) Inventor: Stephan Ruckstuhl, Neuendorf (CH)

(73) Assignee: Eldom Rothrist AG, Rothrist (CH)

( * ) Notice: Subject to any disclaimer, the term of this patent is extended or adjusted under 35 U.S.C. 154(b) by 521 days.

(21) Appl. No.: 11/352,877

(22) Filed: Feb. 13, 2006

(65) Prior Publication Data

US 2007/0186782 A1    Aug. 16, 2007

(51) Int. Cl.
*A47J 31/00* (2006.01)

(52) U.S. Cl. ................................ 99/289 R; 99/295

(58) Field of Classification Search ........... 99/279–307, 99/452–455, 416, 483, 485
See application file for complete search history.

(56) References Cited

U.S. PATENT DOCUMENTS

| 4,579,049 A |   | 4/1986  | Rodrigues          |         |
|-------------|---|---------|--------------------|---------|
| 4,681,028 A |   | 7/1987  | Schmed et al.      |         |
| 4,796,521 A | * | 1/1989  | Grossi ............ | 99/287  |
| 4,852,472 A | * | 8/1989  | In-Albon et al. .. | 99/289 R|
| 4,885,986 A | * | 12/1989 | Grossi ............ | 99/289 R|
| 4,993,315 A |   | 2/1991  | Huber et al.       |         |
| 6,035,762 A | * | 3/2000  | Ruckstuhl ........  | 99/295  |
| 6,240,832 B1|   | 6/2001  | Schmed et al.      |         |
| 6,748,850 B1|   | 6/2004  | Kraan              |         |
| 6,901,846 B2| * | 6/2005  | Ruckstuhl ........  | 99/287  |
| 2003/0116026 A1 | | 6/2003 | Koning et al.    |         |
| 2003/0209150 A1 | | 11/2003| Guindulain Vidondo|        |
| 2004/0060449 A1 | | 4/2004 | Reyhanloo         |         |

FOREIGN PATENT DOCUMENTS

| EP | 0 380 450 A2   | 8/1990  |
| EP | 1 306 041 A1   | 5/2003  |
| EP | 1 336 365 A1   | 8/2003  |
| EP | 1 417 914 A1   | 12/2004 |
| FR | 2663216 A1     | 12/1991 |
| WO | 2004/049878 A1 | 6/2004  |

* cited by examiner

*Primary Examiner*—Timothy F. Simone
(74) *Attorney, Agent, or Firm*—Sughrue Mion, PLLC

(57) ABSTRACT

An apparatus for filling and emptying a brewing chamber (19) comprises a brewing chamber (19) which is open on one side and in which is arranged a displaceable base (12) which can be moved in relation to an opening of the brewing chamber (19) for emptying purposes. The brewing chamber (19) can be pivoted together with the base (12) such that the opening can be filled from above with portion packs. The apparatus according to the invention and the process provide for easy handling by way of preferably just one actuating element (17) for the purpose of initiating the necessary movements.

6 Claims, 5 Drawing Sheets

APPARATUS FOR FILLING AND EMPTYING A BREWING CHAMBER

FIELD OF THE INVENTION

The present invention relates to an apparatus and to a process for filling and emptying a brewing chamber, in particular a brewing chamber of a coffee machine.

BACKGROUND OF THE INVENTION

There are coffee machines which, for the purpose of filling a brewing chamber, contain an accommodating means into which a portion pack can be introduced. The accommodating means can be closed via a housing cover, with the result that the accommodating means is manually filled and emptied. The disadvantage with this filling method is that, following each brewing operation, the portion pack has to be removed manually from the accommodating means, which is a laborious task precisely when a number of portions of coffee are brewed one after the other. It is only following manual emptying that a new portion pack can be introduced, the tasks of filling and emptying requiring a comparatively high level of effort from the user.

SUMMARY OF THE INVENTION

One of the objects of the present invention is thus to provide an apparatus and a process for filling and emptying a brewing chamber which allow the brewing chamber to be easily filled and emptied with only a small number of process steps.

According to the invention, the apparatus preferably has a brewing chamber which is open on one side and on which is arranged a displaceable base. The base here can be moved in relation to an opening of the brewing chamber for emptying purposes, with the result that a portion pack contained in the brewing chamber is automatically removed from the latter and can drop into a collecting container. There is therefore no need for the user to grip the portion pack by hand, which is considered to be considerably more convenient in handling terms. Furthermore, the brewing chamber can be pivoted together with the base, with the result that the opening can be filled from above with portion packs, this making it possible for the emptied brewing chamber to be easily filled with one or more portion packs. All that is required here is for the user to introduce the new portion packs from above and then move the actuating mechanism.

According to a preferred configuration of the invention, the brewing chamber can be latched in the filling position with the opening oriented upward. It is thus possible for the user to maintain the filling position until such time as the portion packs have been introduced.

For easy actuation, the base and the brewing chamber can be moved via in each case one preferably plate-like curved guide. An actuating element may be provided here in order for it to be possible to move both the base and the brewing chamber, so that the user only has to operate this one actuating element for the movement operations.

For a straightforward mechanical configuration of the actuating mechanism, the base is coupled to a first pin and the brewing chamber is coupled to a second pin, these being mounted together on a rotatable curved guide. Pivoting of the actuating element together with the rotatable curved guide thus makes it possible to achieve a corresponding movement of the brewing chamber and of the base. The actuating element here may be coupled to a covering which releases the brewing chamber only in the position in which it is to be filled. As soon as the brewing chamber has been filled, it can be concealed from the outside by virtue of the actuating element and the covering being pivoted.

In the case of the process according to the invention, the first step is movement of the base within the brewing chamber in relation to an opening in order to eject used-up portion packs, before the base is drawn into the brewing chamber in order to form a cup-like brewing chamber. The brewing chamber is then pivoted such that the opening of the brewing chamber is accessible from above, in order that one or more portion packs can be inserted. Thereafter, the brewing chamber is pivoted in relation to a nozzle assembly, which covers over the opening of the brewing chamber, in order that a brewing operation can be initiated. The process according to the invention allows automatic emptying of the brewing chamber and easy handling, where all that is required is for the cup-like brewing chamber to be filled from above.

Following the brewing operation, the brewing chamber is first of all preferably moved away from the nozzle assembly and the base is moved in the opposite direction in the brewing chamber, it also being possible for the two movements to be executed simultaneously. The movement of the brewing chamber away from the nozzle assembly has the advantage that the portion packs contained in the brewing chamber can drop downward into a collecting container.

BRIEF DESCRIPTION OF THE DRAWINGS

The invention is explained in more detail hereinbelow by way of an exemplary embodiment (which shall not be construed to limit the scope of the invention as defined in the appended claims) and with reference to the attached drawings, in which:

DESCRIPTION OF EXAMPLE EMBODIMENTS

Figure 1:
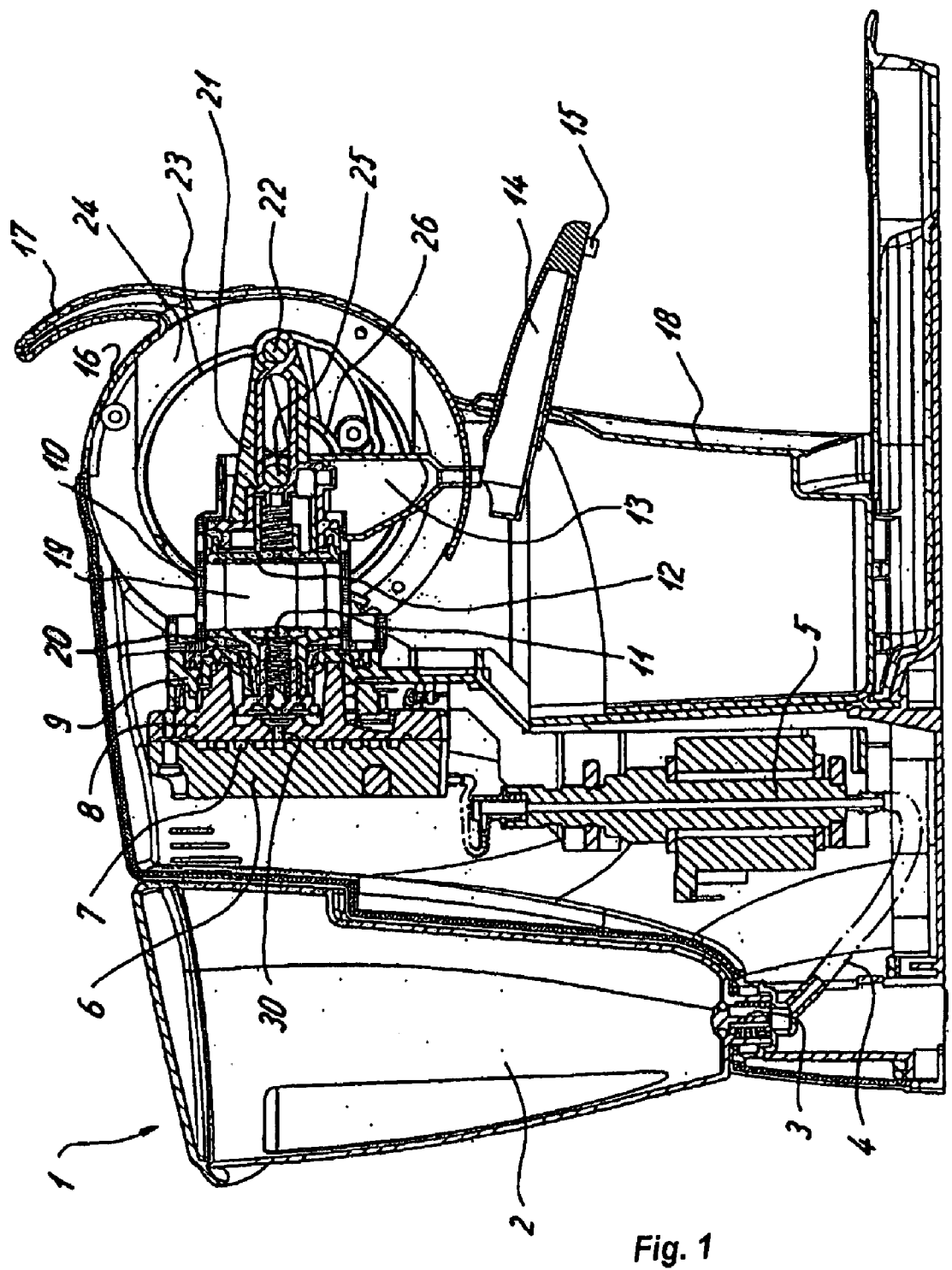
FIG. 1 shows a sectional side view of a coffee machine with an apparatus for filling and emptying a brewing chamber.

A coffee machine 1 which is shown in FIG. 1 comprises a storage container 2 for clean water, the storage container having provided on it an outlet valve 3 which is connected to a pump 5 via line 4. By means of the pump 5, the water can be led to a heating plate 6 which contains helical through-passages 7 in which the water can be heated. Provided alongside this is a plate 8 which forms part of a nozzle assembly and in which is provided a supply line 30 for the heated water. Installed on the plate 8 is a mount 9 for a sealing element 20 which is of essentially annular design and has a nozzle 11 provided in its center. Via the nozzle 11, the heated water can flow into a brewing chamber 19 which is enclosed by a housing 10. Provided on the opposite side of the nozzle 11 is a base 12 which is intended for bounding the brewing chamber 19 and which contains an outflow, with the result that the fluid brewed flows through a funnel-like outlet 13 to an extension arm 14, on which an outlet opening 15 is provided for the purpose of filling coffee cups.

The coffee machine 1 comprises a brewing chamber 19 in which it is possible to insert one or more portion packs with coffee. Provided for this purpose is a cylindrical covering 16 on which is formed a handle 17, via which the housing 10 can be released from the nozzle assembly and pivoted via an actuating mechanism, with the result that the brewing chamber 19 is filled from above. The covering 16 is then closed and the housing 10 is moved into the position shown. Following the brewing operation, the portion packs are then emptied into a collecting container 18 in order for the brewing chamber 19 to be filled anew, as will be explained in detail hereinbelow.

The apparatus for filling and emptying the brewing chamber 19 comprises an extension arm 21 which is coupled to the base 12 and on which a pin 22 is secured. The pin 22 is mounted, at the end, in a curved element 23 of a curved guide 24. In a similar way, the housing 10 of the brewing chamber 19 is coupled to a pin 25, which is fixed in the center of the plate-like curved guide 24. FIG. 1 illustrates only the plate-like curved guide 24 on one side, although, for uniform guidance, a mirror-symmetrical curved guide is also provided on the opposite side of the pins 22 and 25.

The operations of filling and emptying the brewing chamber 19 will be explained in more detail with reference to FIGS. 2-5.

Figure 2:
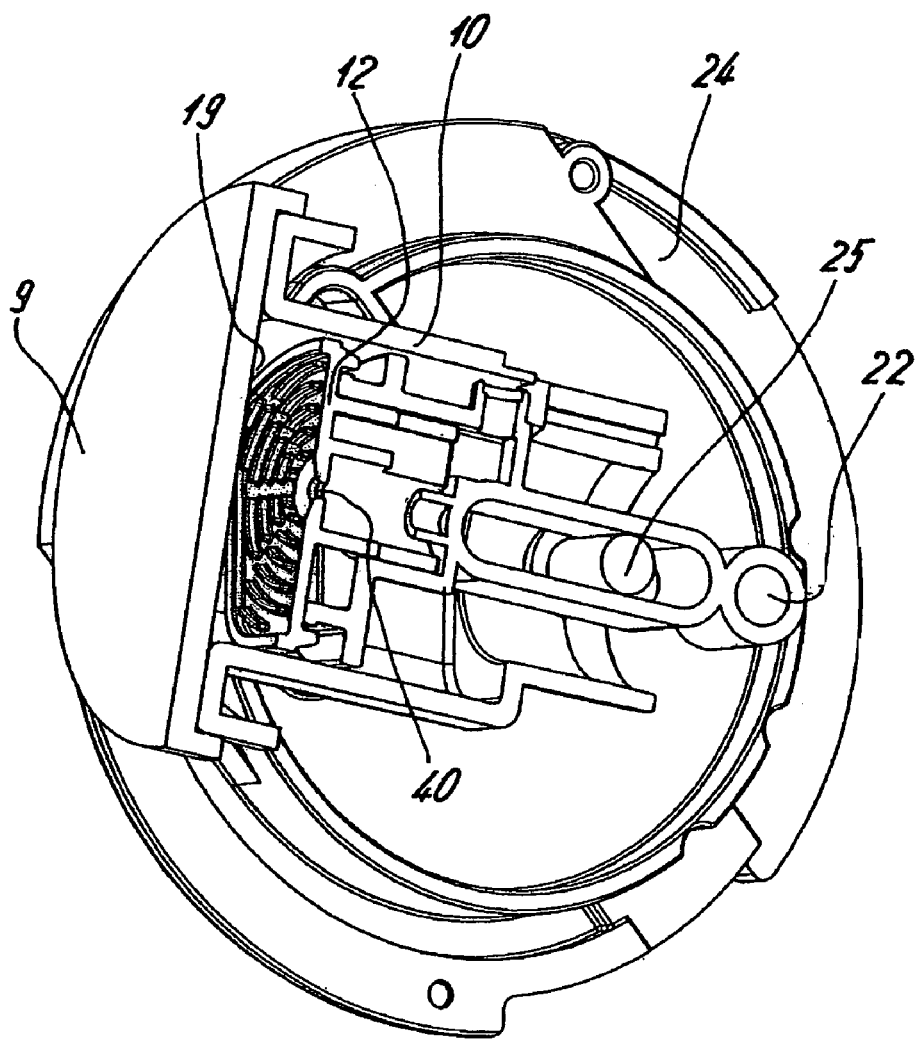
FIGS. 2-5 each show perspective views of the apparatus for filling and emptying the brewing chamber in different process positions.

In FIG. 2, the brewing chamber 19 is located in the brewing position, although, for reasons of clarity, there is no portion pack illustrated in the brewing chamber 19. The brewing chamber 19 is bounded by the housing 10, the base 12 and the schematically illustrated nozzle assembly 9 or nozzle 11. The portion pack here is accommodated in an essentially form-fitting manner in the brewing chamber 19 in order to avoid a bypass by way of flow gaps during the brewing operation. Following extraction, the fluid flows through a discharge means 40 to the funnel 13.

In the brewing position, the covering 16 is located on a housing of the coffee machine 1 such that the brewing chamber 19 is concealed by the housing 10. FIG. 2 illustrates both the position at the beginning of the brewing operation and that following the brewing operation with the used-up portion pack still remaining the brewing chamber 19.

Figure 3:
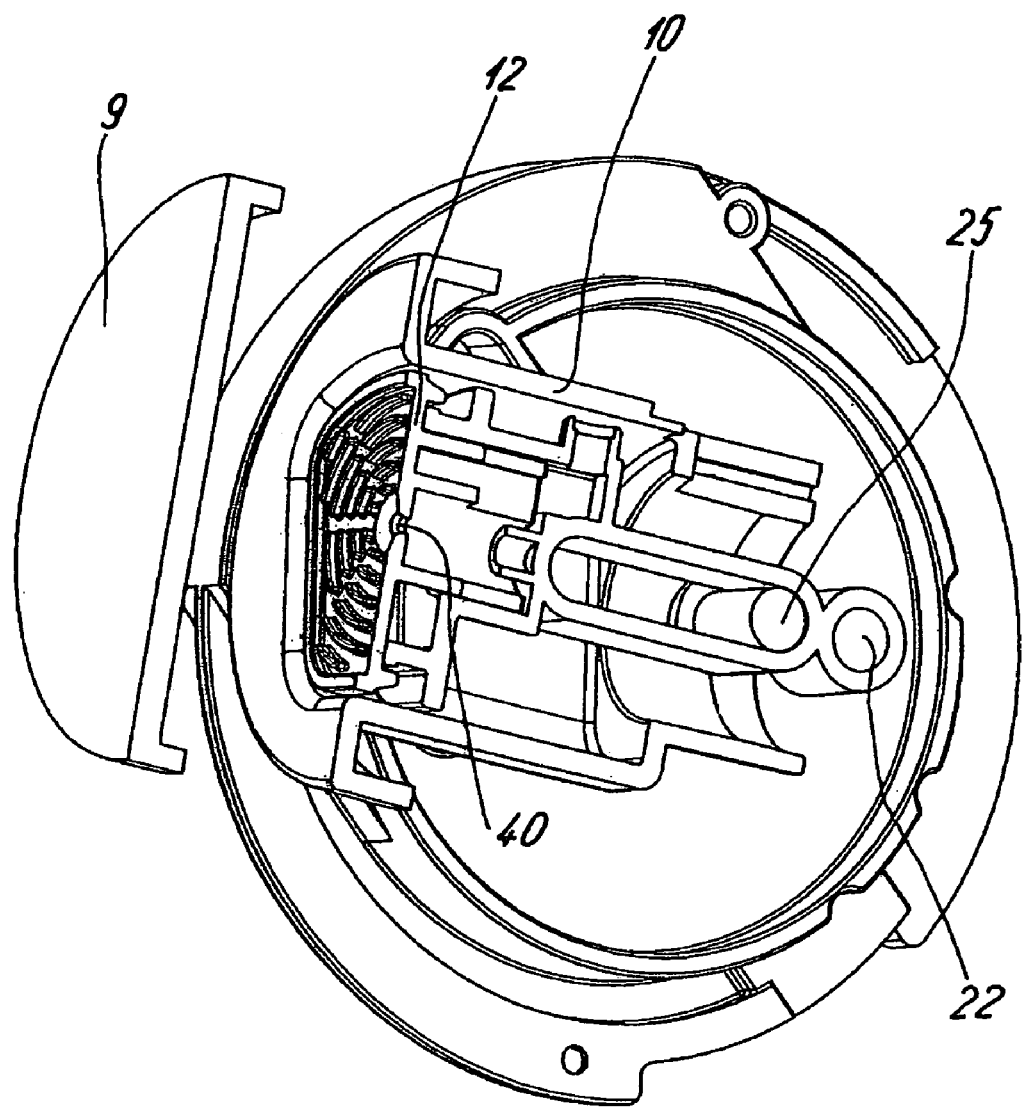

FIG. 3 shows the position in which the portion pack has been ejected from the brewing chamber 19. For this purpose, the base 12 moves in relation to the opening of the brewing chamber 19 on account of pivoting of the actuating element 17 with the covering 16 and in accordance with the curved guides 24, by means of corresponding spring elements (not illustrated specifically here) or other devices, with the result that no more space remains for the portion pack within the brewing chamber 19. The pivoting movement of the actuating element 17 simultaneously moves the housing 10 of the brewing chamber away from the nozzle assembly 9 or the nozzle 11, this resulting in the formation, between the housing 10 and nozzle assembly 9, of a gap 15 through which the used-up portion pack can drop into the collecting container 18.

Figure 4:
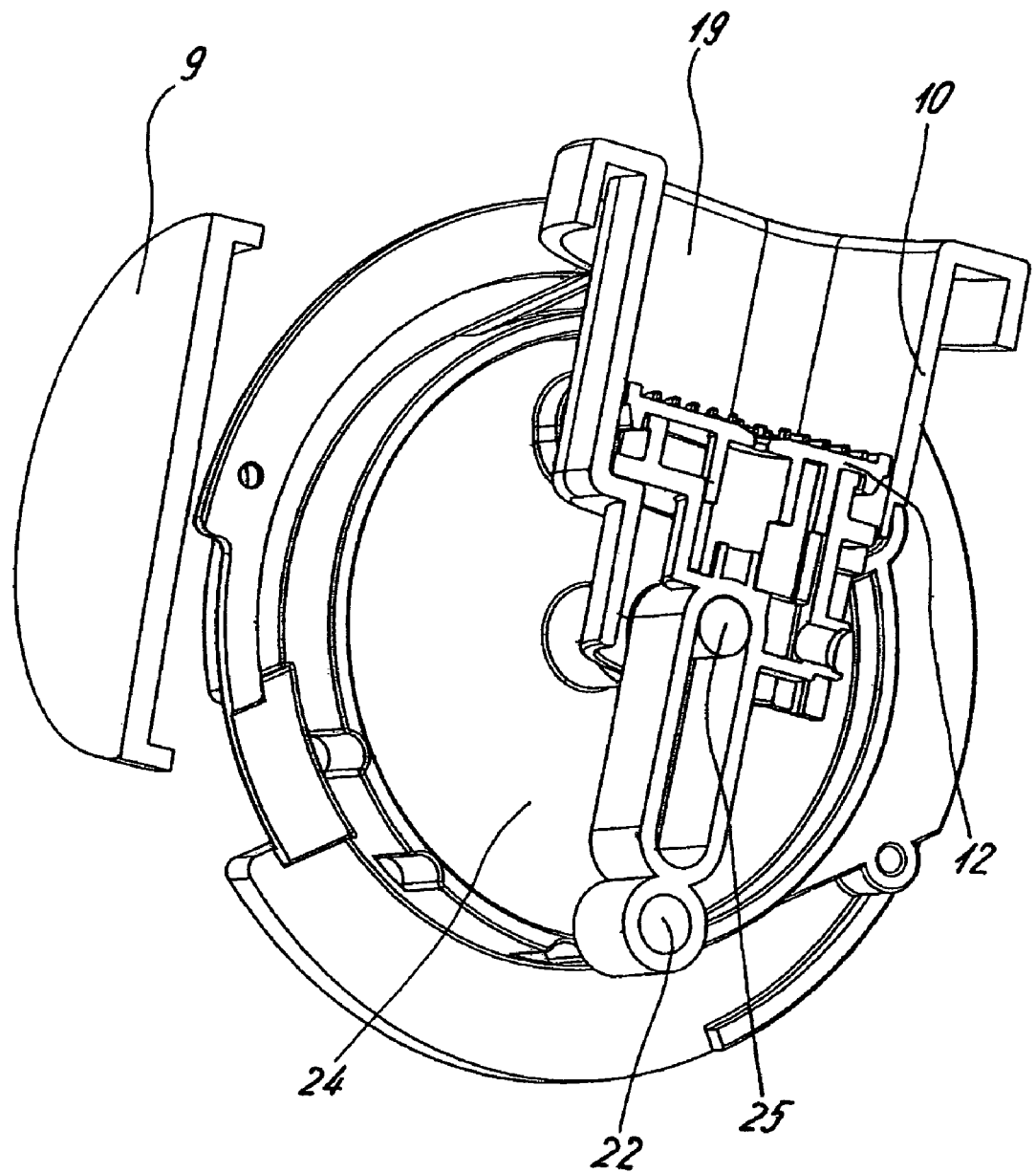

In order to fill the brewing chamber 19, the actuating element 17 is rotated further, as a result of which the position which is shown in FIG. 4 is reached. The further pivoting of the actuating element 17, on the one hand, has drawn the base 12 into the brewing chamber 19 again via the pin 22 and a fixed curved rib, with the result that this brewing chamber forms a cup-like accommodating means for new portion packs. On the other hand, the housing 10 has been pivoted with the brewing chamber 19 such that the opening of the brewing chamber 19 is oriented upward and, from there, can easily be filled with new portion packs.

The pivoting of the actuating element 17 has also removed the covering 16 from the top region, with the result that the opening of the brewing chamber 19 is released. In this position, the actuating element 17 can be latched in order for the brewing chamber 19 to be filled in a rest position.

Figure 5:
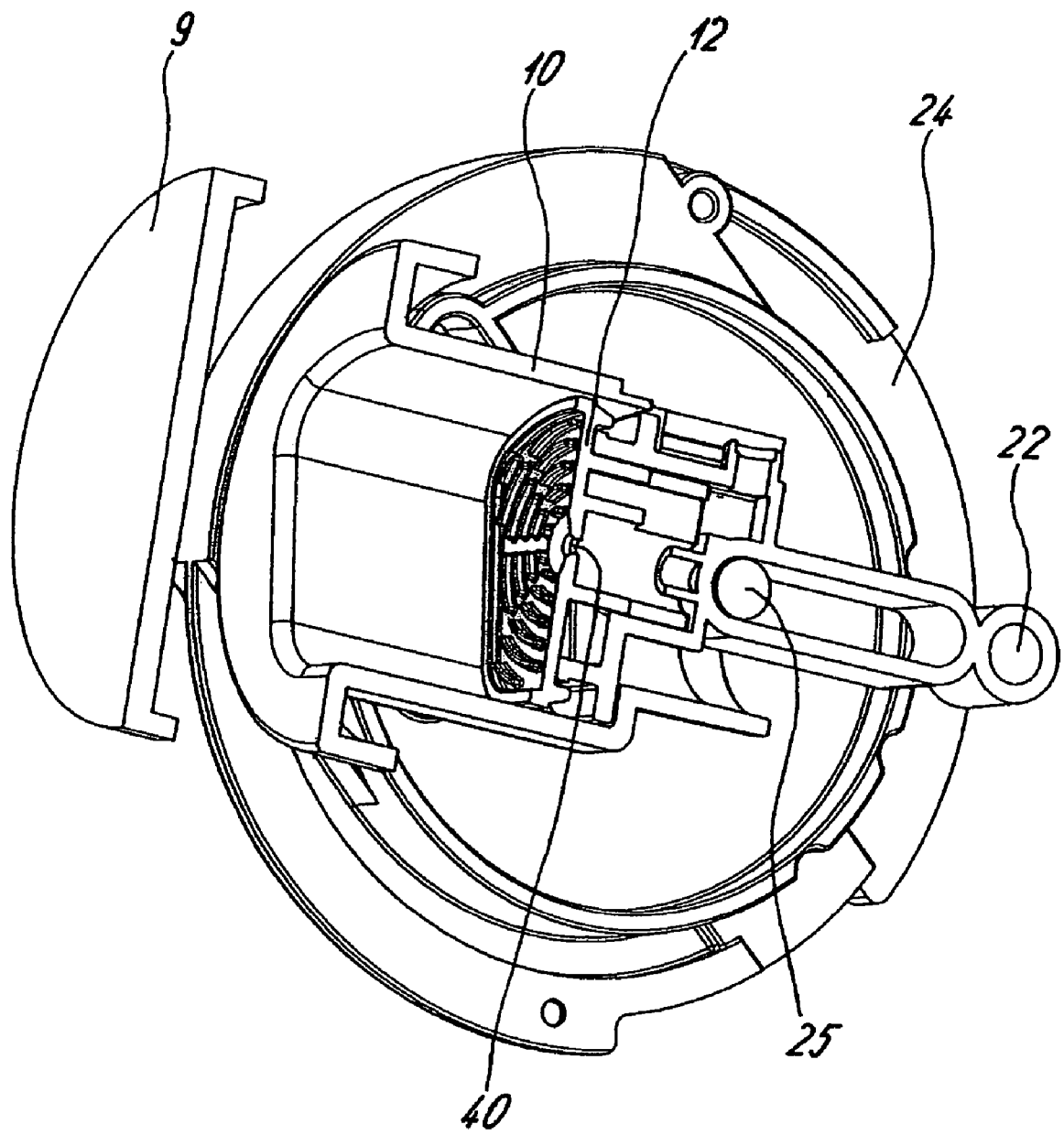

For a further brewing operation, the actuating element 17 is then pivoted back again, as is illustrated in FIG. 5. In a first step, the housing 10 of the brewing chamber 19 is thus pivoted into an essentially horizontal position again, in which the opening of the brewing chamber 19 is located opposite the nozzle assembly 9. The base 12 remains in the drawn-in position and provides the portion packs with sufficient space in the brewing chamber 19.

If the actuating element 17 is pivoted further from the position which is shown in FIG. 5, the brewing chamber 19 is located once again in the position which is shown in FIG. 2, the covering 16 covering over the housing 10 and the base 12 butting against the portion pack in a form-fitting manner. Furthermore, the housing 10 is arranged in a sealed manner on the nozzle assembly 9 in order that the next brewing operation can be carried out.

In the exemplary embodiment illustrated, the brewing chamber 19 and the base 12 can be moved in the desired manner by virtue of the pivoting movement of an actuating element 17. It is also possible, instead of the curved guides 24 shown, to use other mechanical means, for example levers, slides, gearwheels, etc., in order to execute the desired movement of the brewing chamber and of the base.

For filling and emptying purposes, it goes without saying that the filling position does not require the opening to be oriented precisely in the vertical direction; rather, all that is required is for the opening to be directed essentially upward in order that it can be easily filled. It is also the case that the brewing position need not be oriented precisely horizontally; all that is necessary is for the nozzle assembly 9 and the brewing chamber 19 to form a sealed unit.

Furthermore, the actuating element 17 can be prestressed into the closed position in order to allow smooth closure and to prevent the situation where the covering 16 is only incompletely closed. It would also be possible for testing of the closed position of the brewing chamber to be sensed via a sensor, in order to prevent the brewing operating from being initiated when the brewing chamber is partially open.

The invention claimed is:

1. A brewing apparatus adapted for filling and emptying a brewing chamber (19), comprising:
   a brewing chamber (19) which is open on one side, and which is enclosed by a housing (10) and a base (12), said base (12) being arranged displaceable in the housing (10), wherein the base (12) can be moved in relation to an opening of the brewing chamber (19) for emptying purposes, the brewing chamber (19) being pivotable together with the base (12) such that the opening can be filled from above with beverage portion packs, wherein an actuating element (17) is provided so that both the base (12) and the brewing chamber (19) are moveable, and wherein the base (12) is coupled to a first pin (22), which slides and is moved via a rotatable curved guide (24), and wherein the brewing chamber (19) is mounted on a second pin (25) and in the center of the curved guide (24), wherein for a brewing operation, the housing (10) is pivotable into a horizontal position, in which the opening of the brewing chamber (19) is located opposite the nozzle assembly (9), and that for the purpose of ejecting the portion pack from the brewing chamber (19), the base (12) is moveable in relation to the opening of the brewing chamber (19) and the housing (10) is moveable away from a nozzle assembly (9), resulting in the formation, between the housing (10) and nozzle assembly (9), of a gap (15) through which the used-up beverage portion pack can drop into a collecting container (18).

2. The apparatus as claimed in claim 1, wherein the brewing chamber (19) can be latched in the filling position with the opening oriented upward.

3. The apparatus as claimed in claim 1, wherein the base (12) and the brewing chamber (19) can be moved via a fulcrum pin (25) and a curved guide (26).

4. The apparatus as claimed in claim 1, wherein the actuating element (17) can be pivoted together with the rotatable curved guide (24).

5. The apparatus as claimed in claim 1, wherein the actuating element (17) is coupled to a covering (16) which releases the brewing chamber (19) in the position in which it is to be filled.

6. The apparatus as claimed in claim 1, wherein the base (12) is retained such that it can be moved via a spring.

* * * * *